United States Patent
Komatsubara et al.

(10) Patent No.: US 9,476,449 B2
(45) Date of Patent: Oct. 25, 2016

(54) FLUID DYNAMIC BEARING DEVICE AND MOTOR WITH SAME

(71) Applicants: Shinji Komatsubara, Mie (JP); Tetsuya Kurimura, Mie (JP); Yasuhiro Yamamoto, Mie (JP)

(72) Inventors: Shinji Komatsubara, Mie (JP); Tetsuya Kurimura, Mie (JP); Yasuhiro Yamamoto, Mie (JP)

(73) Assignee: NTN CORPORATION, Osaka (JP)

( * ) Notice: Subject to any disclaimer, the term of this patent is extended or adjusted under 35 U.S.C. 154(b) by 8 days.

(21) Appl. No.: 14/425,972

(22) PCT Filed: Aug. 19, 2013

(86) PCT No.: PCT/JP2013/072048
§ 371 (c)(1),
(2) Date: Mar. 4, 2015

(87) PCT Pub. No.: WO2014/045772
PCT Pub. Date: Mar. 27, 2014

(65) Prior Publication Data
US 2015/0233417 A1    Aug. 20, 2015

(30) Foreign Application Priority Data
Sep. 18, 2012  (JP) ................. 2012-204096

(51) Int. Cl.
*F16C 32/06* (2006.01)
*F16C 17/10* (2006.01)
*F16C 33/10* (2006.01)

(52) U.S. Cl.
CPC ........... *F16C 17/107* (2013.01); *F16C 33/104* (2013.01)

(58) Field of Classification Search
CPC ..................... F16C 17/107; F16C 33/104
See application file for complete search history.

(56) References Cited

U.S. PATENT DOCUMENTS

| 8,454,239 | B2 * | 6/2013 | Bitou | F16C 17/026 384/100 |
| 2002/0051588 | A1 * | 5/2002 | Koseki | F16C 17/026 384/100 |
| 2003/0091249 | A1 | 5/2003 | Kurimura et al. | |
| 2004/0017954 | A1 | 1/2004 | Komori et al. | |
| 2006/0120643 | A1 | 6/2006 | Kurimura et al. | |

(Continued)

FOREIGN PATENT DOCUMENTS

| JP | 10-9250 | 1/1998 |
| JP | 11-201142 | 7/1999 |

(Continued)

OTHER PUBLICATIONS

Extended European Search Report issued Apr. 15, 2016 in counterpart European Application No. 13839464.8.

(Continued)

*Primary Examiner* — Thomas R. Hannon
(74) *Attorney, Agent, or Firm* — Wenderoth, Lind & Ponack, L.L.P.

(57) ABSTRACT

A fluid dynamic bearing device including: a bearing sleeve fixed to an inner periphery of a housing; a shaft member removably inserted along an inner periphery of the bearing sleeve; an annular member having an inner peripheral surface for defining a radial gap together with an outer peripheral surface of the shaft member; and radial bearing portions and a thrust bearing portion for supporting the shaft member. At least the radial bearing gap at each of the radial bearing portions, and a bottom gap having the thrust bearing portion received therein are filled with lubricating oil. A void section is formed in an interior space of the housing. Assuming that $d_1$ represents a gap width of the radial bearing gap and $d_2$ represents a gap width of the radial gap, a relationship of $30d_1 \leq d_2 \leq 250d_1$ is satisfied.

9 Claims, 5 Drawing Sheets

(56) References Cited

U.S. PATENT DOCUMENTS

| | | |
|---|---|---|
| 2007/0025652 A1 | 2/2007 | Satoji et al. |
| 2007/0230843 A1 | 10/2007 | Kurimura et al. |
| 2008/0107368 A1 | 5/2008 | Kurimura et al. |
| 2008/0187258 A1 | 8/2008 | Kurimura et al. |
| 2008/0212906 A1 | 9/2008 | Kurimura et al. |
| 2011/0033143 A1* | 2/2011 | Yamada .................. F16C 17/04 384/107 |
| 2012/0230618 A1 | 9/2012 | Suzuki et al. |

FOREIGN PATENT DOCUMENTS

| | | |
|---|---|---|
| JP | 2002-106549 | 4/2002 |
| JP | 2003-307212 | 10/2003 |
| JP | 2004-138215 | 5/2004 |
| JP | 2005-337377 | 12/2005 |
| JP | 2007-120653 | 5/2007 |

OTHER PUBLICATIONS

International Preliminary Report on Patentability and Written Opinion of the International Searching Authority issued Mar. 24, 2015 in International (PCT) Application No. PCT/JP2013/072048.

International Search Report issued Nov. 19, 2013 in International (PCT) Application No. PCT/JP2013/072048.

Office Action issued May 11, 2016 in corresponding Japanese Patent Application No. 2012-204096, with English translation.

* cited by examiner

⟹ :Flow of Lubricating Oil

US 9,476,449 B2

FLUID DYNAMIC BEARING DEVICE AND MOTOR WITH SAME

TECHNICAL FIELD

A present invention relates to a fluid dynamic bearing device and a motor including the fluid dynamic bearing device.

BACKGROUND ART

As is well known, fluid dynamic bearing devices have features in their high speed rotation, high rotational accuracy, quietness, and the like. Thus, the fluid dynamic bearing devices are suitably used as bearing devices for motors to be mounted to various electrical apparatus such as information apparatus, and more specifically, as bearing devices for spindle motors to be built in disk drives of HDDs and the like, for fan motors to be built in PCs and the like, or for polygon scanner motors to be built in laser beam printers (LBPs).

An example of the fluid dynamic bearing device is disclosed in Patent Literature 1. The fluid dynamic bearing device includes a housing having a bottomed cylindrical shape (cup shape), a bearing sleeve fixed to an inner periphery of the housing, a shaft member removably inserted along an inner periphery of the bearing sleeve, a radial bearing portion for supporting the shaft member in a radial direction by an oil film of lubricating oil formed in a radial bearing gap, a thrust bearing portion for supporting the shaft member in a thrust direction, a bottom gap having the thrust bearing portion received therein, and an annular member (sealing member) fixed to an inner periphery of an opening portion of the housing.

In the fluid dynamic bearing device, the annular member is fixed to the inner periphery of the opening portion of the housing in a state of engaging with the bearing sleeve in an axial direction (state of engaging with the bearing sleeve in a direction of removing the bearing sleeve). Accordingly, a force for fixing the bearing sleeve to the housing (force for removing the bearing sleeve) is increased, and thus relative positions of the housing and the bearing sleeve in the axial direction, and also desired bearing performance are maintained stably. Further, the fluid dynamic bearing device is used in a so-called fully-filled state in which an entire interior space of the housing is filled with the lubricating oil, and a sealing space (radial gap having a gap width larger than that of the radial bearing gap) is formed between an inner peripheral surface of the annular member and an outer peripheral surface of the shaft member. The sealing space is designed to function as a buffer for absorbing an amount of a volume change accompanied with a temperature change of the lubricating oil, thereby being capable of always maintaining an oil level of the lubricating oil in the sealing space within a range of the assumed temperature change. Therefore, reduction in bearing performance and contamination of peripheral environment, which result from leakage of the lubricating oil to an outside, can be prevented as much as possible.

CITATION LIST

Patent Literature 1: JP 2003-307212 A

SUMMARY OF INVENTION

Technical Problem

However, when the so-called fully-filled structure in which an entire interior space of the housing is filled with the lubricating oil is employed as described above, after assembly of the fluid dynamic bearing device, the interior space of the housing needs to be filled with the lubricating oil by a complicated process such as so-called vacuum impregnation, and the oil level of the lubricating oil needs to be managed with high accuracy (a filling amount of the lubricating oil needs to be finely adjusted). Thus, there has been pointed out a problem of a difficulty in satisfying the demand for further cost reduction of the fluid dynamic bearing device.

In view of the circumstances, it is an object of the present invention to provide a fluid dynamic bearing device that can be manufactured at low cost and exert desired bearing performance.

Solution to Problem

According to one embodiment of the present invention, which is devised to achieve the above-mentioned object, there is provided a fluid dynamic bearing device, comprising: a housing formed into a bottomed cylindrical shape so as to have one open axial end and another closed axial end; a bearing sleeve fixed to an inner periphery of the housing; a shaft member removably inserted along an inner periphery of the bearing sleeve; an annular member having an inner peripheral surface for defining a radial gap together with an outer peripheral surface of the shaft member, the annular member being fixed to an inner periphery of the one open axial end of the housing in a state of engaging with the bearing sleeve in an axial direction; a radial bearing portion for supporting the shaft member in a radial direction by an oil film of lubricating oil, which is formed in a radial bearing gap defined between an inner peripheral surface of the bearing sleeve and the outer peripheral surface of the shaft member; a thrust bearing portion for supporting the shaft member in a thrust direction; and a bottom gap having the thrust bearing portion received therein, and being filled with the lubricating oil, wherein the housing has a void section formed in an interior space thereof, and wherein assuming that $d_1$ represents a gap width of the radial bearing gap and $d_2$ represents a gap width of the radial gap, a relationship of $30d_1 \leq d_2 \leq 250d_1$ is satisfied. Note that, the "thrust bearing portion" described herein may be formed of a pivot bearing for supporting the shaft member in a contact manner, or a fluid dynamic bearing for supporting the shaft member in a non-contact manner.

In the fluid dynamic bearing device according to the one embodiment of the present invention, in a situation where the radial bearing gap at the radial bearing portion, and the bottom gap having the thrust bearing portion received therein are filled with the lubricating oil, the void section is formed in the interior space of the housing (hereinafter simply referred to also as "interior space"). This means that an amount of the lubricating oil filled into the interior space of the housing is smaller than a volume of the above-mentioned interior space, and that a region filled with no lubricating oil is formed in the above-mentioned interior space. In the fluid dynamic bearing device according to the one embodiment of the present invention, the shaft member is insertable into and removable from the bearing sleeve. With this configuration, for example, only by injecting the lubricating oil into the interior space using an appropriate oil dispenser (such as a micropipette) after the bearing sleeve and the annular member are fixed to the inner periphery of the housing and before the shaft member is inserted along the inner periphery of the bearing sleeve, a necessary amount of the lubricating oil can be filled in the interior space. Therefore, a large-scale device for oil injection and operations to adjust and manage an oil level with high accuracy is not needed, with the result that the bearing device can be manufactured at low cost.

As described above, in view of structure of the fluid dynamic bearing device according to the one embodiment of the present invention, operations to inject oil into the interior space can be carried out after the bearing sleeve and the annular member are fixed to the inner periphery of the housing and before the shaft member is inserted along the inner periphery of the bearing sleeve. In this case, as compared to a case where oil injection into the interior space is carried out after the shaft member is inserted along the inner periphery of the bearing sleeve, oil injecting operations can be carried out more easily and appropriately. However, in a case where no measure is taken, the lubricating oil is liable to leak along with insertion of the shaft member along the inner periphery of the bearing sleeve after oil injection. A mechanism of occurrence of leakage of the lubricating oil is described with reference to FIGS. 7A and 7B.

First, as illustrated in FIG. 7A, a bearing sleeve 108 and an annular member 109 are fixed to an inner periphery of a housing 107 so that a bottom gap 105 is defined between a bottom portion of the housing 107 and the bearing sleeve 108. Then, lubricating oil 110 is injected into an interior space of the housing 107. Next, as illustrated in FIG. 7B, a shaft member 102 is inserted into the annular member 109 and along an inner periphery of the bearing sleeve 108. When the shaft member 102 comes into contact with the lubricating oil 110 injected in advance, the lubricating oil 110 flows by a capillary force toward an opening portion of the housing 107 through a radial gap (radial bearing gap) defined between (an outer peripheral surface of) the shaft member 102 and (an inner peripheral surface of) the bearing sleeve 108 so as to have a minute gap width. Then, the lubricating oil 110 adheres to the outer peripheral surface of the shaft member 102, and also to an inner peripheral surface of the annular member 109. Along with progress of insertion of the shaft member 102, the air present in the interior space of the housing 107 (between the shaft member 102 and the housing 107) is compressed. As a result, an urging force for pushing out the lubricating oil 110 toward an outside of the bearing is applied to the lubricating oil 110 filled between the shaft member 102 and the bearing sleeve 108 and between the shaft member 102 and the annular member 109. In this manner, the lubricating oil 110 leaks to the outside of the bearing through the radial gap (sealing space) 103 defined between the outer peripheral surface of the shaft member 102 and the inner peripheral surface of the annular member 109. In this case, a sufficient amount of the lubricating oil cannot be filled both in the radial bearing gap and the bottom gap 105, with the result that it is difficult to stably ensure desired bearing performance.

According to studies diligently conducted by the inventors of the present invention, the following has been found as a result. That is, when $d_2$ represents a gap width of the radial gap, in a case where a value of $d_2$ exceeds a predetermined value, the lubricating oil can be prevented as much as possible from adhering to the inner peripheral surface of the annular member along with insertion of the shaft member, and leakage of the lubricating oil in the above-mentioned manner can be prevented as much as possible.

Specifically, it has been found that the leakage can be solved in such a manner that, when $d_1$ represents a gap width of the radial bearing gap and $d_2$ represents a gap width of the radial gap, the gap width $d_2$ of the radial gap is set so as to satisfy a relationship of $30d_1 \leq d_2$. Thus, assembly of the bearing device and oil injection into the bearing device can be carried out easily, and the fluid dynamic bearing device can be manufactured at low cost. However, when the gap width $d_2$ of the radial gap is set to an extremely large size, a contact area between the bearing sleeve and the annular member is extremely small, and hence it may be difficult to ensure a necessary force for removing the bearing sleeve. Therefore, it is preferred that a relationship of $d_2 \leq 250d_1$ be satisfied.

The bearing device having the above-mentioned configuration may further comprise a communication path for communicating the radial gap and the bottom gap to each other. With this, even in a case where the shaft member is inserted along the inner periphery of the bearing sleeve after the lubricating oil is injected into the interior space, the air that is pumped into the bottom gap side along with insertion of the shaft member can be discharged to atmosphere through the communication path, and hence it is possible to more effectively prevent the lubricating oil from leaking to the outside along with insertion of the shaft member. Note that, at least a part of the communication path is employed as the above-mentioned void section.

The above-mentioned communication path may comprise: a first path formed between the housing and the bearing sleeve so as to have one end that is open to the bottom gap; and a second path formed between the bearing sleeve and the annular member so as to have one end that is open to the radial gap, and another end that is continuous with another end of the first path.

The bearing sleeve can be fixed to the inner periphery of the housing by, for example, press fitting (specifically, press fitting with a large interference, the same is true for the following means), bonding, or press-fit bonding (combination of press fitting and bonding). However, in press fitting, deformation of the bearing sleeve accompanied with press fitting affects an inner peripheral surface of the bearing sleeve, and may exert an adverse influence on width accuracy of the radial bearing gap. Further, in bonding, it is necessary to relatively position the housing and the bearing sleeve and retain the housing and the bearing sleeve until an applied adhesive is cured, and in addition, it is sometimes necessary to provide another process of curing the adhesive. Accordingly, time and effort are required for fixing both the members. In this context, the bearing sleeve is fixed to the inner periphery of the housing while being sandwiched from both axial sides thereof between the annular member and the bottom portion of the housing. In this manner, it is possible to reduce time and effort necessary for assembly. In addition, exertion of an adverse influence on bearing performance of the radial bearing portion can be prevented as much as possible.

In the above-mentioned configuration, the radial bearing gap may be formed at two axial positions. In this case, radial dynamic pressure generating portions for causing dynamic pressure generating action in the lubricating oil in the radial bearing gaps may be formed also at two axial positions. With this configuration, it is possible to increase load capacity (moment rigidity) to moment load while reducing loss torque. At this time, it is desired that one of the radial dynamic pressure generating portions be formed into such a shape as to pump the lubricating oil, which is filled in one of the radial bearing gaps, into another one of the radial bearing gaps, and that another one of the radial dynamic pressure generating portions be formed into such a shape as to pump the lubricating oil, which is filled in the another one of the radial bearing gaps, into the one of the radial bearing gaps. With this configuration, while preventing as much as possible reduction in bearing performance of the radial bearing portion due to shortage of the oil film in each radial bearing gap, the lubricating oil filled in the radial bearing gaps can be prevented from flowing toward the above-mentioned radial gap, and in addition, the lubricating oil can be prevented from leaking to the outside as much as possible.

In the above-mentioned configuration, the shaft member may be subjected to an external force for forcing the shaft member to an inner bottom surface of the housing. With this, the shaft member can be supported in both thrust directions, and hence support accuracy in the thrust directions is increased. In addition, the present invention has an advantage in preventing unintended removal of the shaft member that is removably inserted into the bearing sleeve. As an example of the external force described above, a magnetic force may be applied. This magnetic force can be applied, for example, by arranging, with a shift in the axial direction, stator coils provided to a holding member (motor base) for holding the housing on its inner periphery, and a rotor magnet provided to the shaft member. Normally, various motors having built therein the fluid dynamic bearing device of this type comprise, as essential components, the rotor magnet and the stator coils. Thus, when the above-mentioned configuration is employed, the external force can be inexpensively applied without involving a significant cost increase.

It is preferred that the bearing sleeve comprise a porous body having internal pores impregnated with the above-mentioned lubricating oil. With this, the lubricating oil seeps out of the pores in a surface of the bearing sleeve, and hence both the radial bearing gap and the bottom gap can be filled with a sufficient amount of the lubricating oil. Thus, the present invention is advantageous in stably maintaining bearing performance of the radial bearing portions and the thrust bearing portion.

It is preferred that the lubricating oil, which is used in the fluid dynamic bearing device according to the one embodiment of the present invention, comprise ester-based or PAO-based lubricating oil having kinematic viscosity of 20 to 90 mm$^2$/s at 40° C., and surface tension of 29 to 31 mN/m at 20° C.

As described above, the fluid dynamic bearing device according to one embodiment of the present invention has the above-mentioned various features. Thus, the fluid dynamic bearing device can be suitably used by being built in various motors such as a fan motor for PCs and a spindle motor for disk drives, and can also contribute to cost reduction of those various motors.

Advantageous Effects of Invention

As described above, according to the one embodiment of the present invention, it is possible to provide the fluid dynamic bearing device that can be manufactured at low cost and exert desired bearing performance.

DESCRIPTION OF EMBODIMENT

Now, description is made of an embodiment of the present invention with reference to the drawings.

Figure 1:
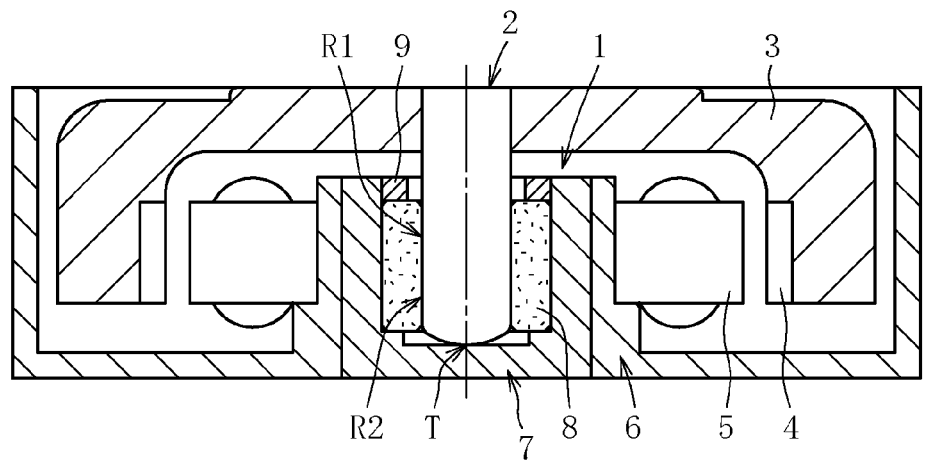
FIG. 1 is a schematic cross-sectional view illustrating a structural example of a fan motor.

FIG. 1 schematically illustrates a structural example of a fan motor having built therein a fluid dynamic bearing device 1 according to the present invention. The fan motor device 1 illustrated in FIG. 1 comprises the fluid dynamic bearing device 1, a motor base 6 serving as a holding member on a stationary side of the motor, stator coils 5 mounted to the motor base 6, a rotor 3 serving as a rotary member and comprising blades (not shown), and a rotor magnet 4 being mounted to the rotor 3 and facing the stator coils 5 across a radial gap. A housing 7 of the fluid dynamic bearing device 1 is fixed to an inner periphery of the motor base 6, and the rotor 3 is fixed to one end of a shaft member 2 of the fluid dynamic bearing device 1. In the fan motor having such a structure, when the stator coils 5 are energized, an electromagnetic force is generated between the stator coils 5 and the rotor magnet 4 so as to cause the rotor magnet 4 to rotate. In conjunction therewith, the shaft member 2 and the rotor 3 fixed to the shaft member 2 are integrally rotated.

Note that, when the rotor 3 is rotated, wind is blown upward or downward in FIG. 1 depending on a form of the blades provided to the rotor 3. Thus, during rotation of the rotor 3, a reactive force of this blowing action is applied as an upward or downward thrust force in FIG. 1 to the shaft member 2 of the fluid dynamic bearing device 1. In a region between the stator coils 5 and the rotor magnet 4, a magnetic force (repulsive force) is applied in a direction in which the thrust force is counterbalanced. A thrust load, which is generated by a difference in magnitude between the thrust force and the magnetic force, is supported by a thrust bearing portion T of the fluid dynamic bearing device 1. The magnetic force in the direction in which the thrust force is counterbalanced can be generated, for example, by arranging the stator coils 5 and the rotor magnet 4 with a shift in the axial direction (not shown in detail). Further, during the rotation of the rotor 3, a radial load is applied to the shaft member 2 of the fluid dynamic bearing device 1. This radial load is supported by radial bearing portions R1, R2 of the fluid dynamic bearing device 1.

Figure 2:
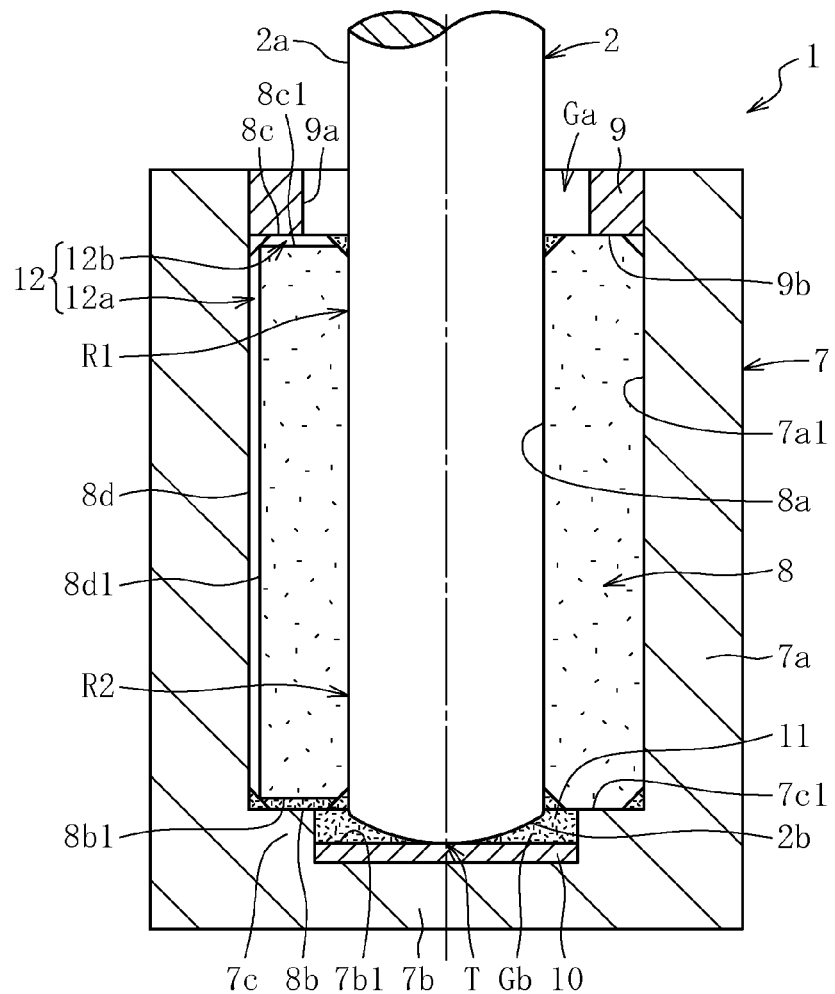
FIG. 2 is a cross-sectional view illustrating a fluid dynamic bearing device according to a first embodiment of the present invention.

FIG. 2 illustrates the fluid dynamic bearing device 1 according to the embodiment of the present invention. The fluid dynamic bearing device 1 comprises, as main components, the housing 7 having a bottomed cylindrical shape, a bearing sleeve 8 fixed to an inner periphery of the housing 7, the shaft member 2 inserted along an inner periphery of the bearing sleeve 8, and an annular member 9 fixed to the inner periphery of the housing 7 on an opening side of the housing 7 with respect to the bearing sleeve 8. An interior space of the housing 7 is filled with a predetermined amount of lubricating oil 11 (indicated by densely dotted hatching). At least a radial bearing gap Gr (see FIG. 4) at each of the radial bearing portions R1, R2 for supporting the shaft member 2 in a radial direction, and a bottom gap Gb having received therein the thrust bearing portion T for supporting the shaft member 2 in a thrust direction are filled with the lubricating oil 11. Note that, in the following description, for the sake of convenience of description, a side on which the annular member 9 is arranged is hereinafter referred to as an upper side, and an opposite side in an axial direction is hereinafter referred to as a lower side. However, this definition does not limit a posture of the fluid dynamic bearing device 1 in use.

The housing 7 has the bottomed cylindrical shape comprising a circular cylindrical portion 7a and a bottom portion 7b closing a lower end opening of the cylindrical portion 7a. In this case, the circular cylindrical portion 7a and the bottom portion 7b are integrally made of metal. On an inner periphery of a boundary portion between the cylindrical portion 7a and the bottom portion 7b, a stepped portion 7c is formed integrally with the cylindrical portion 7a and the bottom portion 7b. (A radially outer region of) a lower end surface 8b of the bearing sleeve 8 abuts on an upper end surface 7c1 of the stepped portion 7c. In this embodiment, a thrust plate 10 made of, for example, a resin is arranged in a region of an inner bottom surface 7b1 of the housing 7 serving as a thrust bearing surface. However, it is not always necessary to provide the thrust plate 10, and the thrust plate 10 may be omitted. The housing 7 may be also obtained by injection molding of a resin.

The shaft member 2 is made of a metal material having high rigidity, which is typified by stainless steel. An outer peripheral surface 2a of the shaft member 2 is formed into a smooth cylindrical surface, and the shaft member 2 is formed so as to have a uniform diameter over its entire length. An outer diameter dimension of the shaft member 2 is smaller than inner diameter dimensions of the bearing sleeve 8 and the annular member 9. Therefore, the shaft member 2 is insertable into and removable from the bearing sleeve 8 and the annular member 9. A lower end surface 2b of the shaft member 2 is formed into a convex spherical surface, and is held in contact with the inner bottom surface 7b1 of the housing 7 (an upper end surface of the thrust plate 10). The rotor 3 comprising blades is fixed to an upper end of the shaft member (see FIG. 1).

The bearing sleeve 8 is obtained by forming a porous body, specifically, a porous body of sintered metal containing, as a main component, copper powder (including copper-based alloy powder) or iron powder (iron-based alloy powder) into a cylindrical shape. The above-mentioned lubricating oil 11 is impregnated into internal pores of the bearing sleeve 8. The bearing sleeve 8 is not always formed of a porous body of sintered metal, and may be formed of other porous bodies such as a porous resin. The bearing sleeve 8 is fixed to the inner periphery of the housing 7 under a state in which the lower end surface 8b of the bearing sleeve 8 abuts on the upper end surface 7c1 of the stepped portion 7c of the housing 7. With this, relative positions of the housing 7 and the bearing sleeve 8 in the axial direction are determined, and the bottom gap Gb having a predetermined volume is formed between the lower end surface 8b of the bearing sleeve 8 and the inner bottom surface 7b1 of the housing 7 (the upper end surface of the thrust plate 10).

The bearing sleeve 8 can be fixed to the inner periphery of the housing 7 by appropriate means such as press fitting (press fitting with a large interference), bonding, and press-fit bonding (combination of press fitting and bonding). However, in this embodiment, the bearing sleeve 8 is fixed to the inner periphery of the housing 7 by being sandwiched from both axial sides thereof between the annular member 9 and (the stepped portion 7c formed at a radially outer end of) the bottom portion 7b of the housing 7. In this manner, the annular member 9 is fixed to the housing 7, and at the same time, the bearing sleeve 8 can be fixed to the housing 7. Accordingly, it is possible to reduce time and effort necessary for assembly of members. Further, when the bearing sleeve 8 is press-fitted with a large interference to the inner periphery of the metal housing 7 according to this embodiment, deformation of the bearing sleeve 8 accompanied with press fitting affects an inner peripheral surface 8a of the bearing sleeve 8, and may exert an adverse influence on width accuracy of the radial bearing gap Gr, and bearing performance of the radial bearing portions R1, R2 as well. However, with the above-mentioned fixing method, this adverse influence can be prevented as much as possible.

Figure 3:
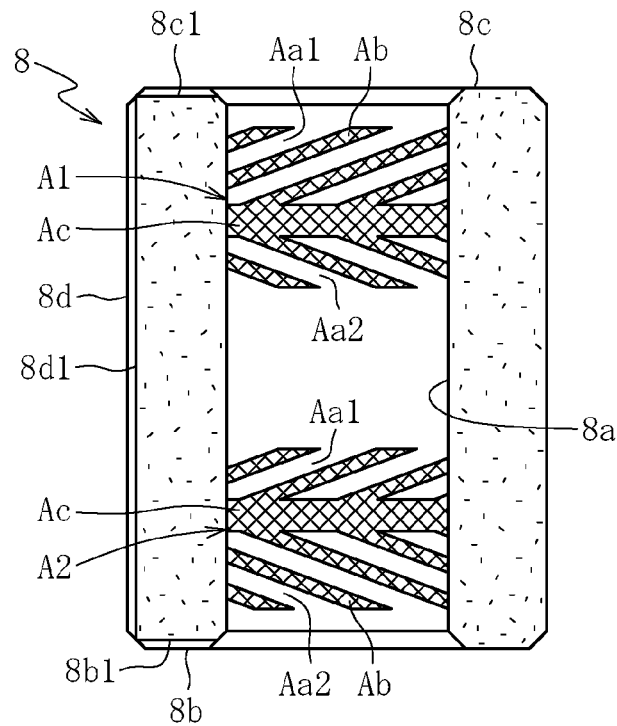
FIG. 3 is a cross-sectional view illustrating a bearing sleeve illustrated in FIG. 2.

Cylindrical radial bearing surfaces are formed at two axial positions on the inner peripheral surface 8a of the bearing sleeve 8. The cylindrical radial bearing surfaces define the radial bearing gaps Gr (see FIG. 4) together with the outer peripheral surface 2a of the shaft member 2 opposed to the inner peripheral surface 8a. As illustrated in FIG. 3, on the radial bearing surfaces, dynamic pressure generating portions (radial dynamic pressure generating portions) A1, A2 for causing dynamic pressure generating action in the lubricating oil 11 in the radial bearing gaps are formed, respectively. The radial dynamic pressure generating portions A1, A2 according to this embodiment each comprise a plurality of upper dynamic pressure generating grooves Aa1 and a plurality of lower dynamic pressure generating grooves Aa2 that are inclined in opposite directions and spaced apart from each other in the axial direction, and convex hill portions that partition both the dynamic pressure generating grooves Aa1, Aa2. The radial dynamic pressure generating portions A1, A2 each exhibit a herringbone shape as a whole. The hill portions according to this embodiment comprise inclined hill portions Ab formed between the dynamic pressure generating grooves that are adjacent to each other in a circumferential direction, and annular hill portions Ac formed between the upper dynamic pressure generating grooves Aa1 and the lower dynamic pressure generating grooves Aa2 so as to have substantially the same diameter as that of the inclined hill portions Ab.

In the upper radial dynamic pressure generating portion A1, an axial dimension of the upper dynamic pressure generating grooves Aa1 is larger than an axial dimension of the lower dynamic pressure generating grooves Aa2. On the other hand, in the lower radial dynamic pressure generating portion A2, an axial dimension of the lower dynamic pressure generating grooves Aa2 is larger than an axial dimension of the upper dynamic pressure generating grooves Aa1. In addition, the axial dimension of the upper dynamic pressure generating grooves Aa1 forming the radial dynamic pressure generating portion A1 is equal to the axial dimension of the lower dynamic pressure generating grooves Aa2 forming the radial dynamic pressure generating portion A2. Further, the axial dimension of the lower dynamic pressure generating grooves Aa2 forming the radial dynamic pressure generating portion A1 is equal to the axial dimension of the upper dynamic pressure generating grooves Aa1 forming the radial dynamic pressure generating portion A2. Therefore, during rotation of the shaft member 2, the lubricating oil 11 filled in the upper radial bearing gap Gr (radial bearing portion R1) and the lubricating oil 11 filled in the lower radial bearing gap Gr (radial bearing portion R2) are pumped into the lower and upper radial bearing gaps, respectively.

Note that, the radial dynamic pressure generating portions A1, A2 may be molded, for example, simultaneously with molding of the bearing sleeve 8 (specifically, simultaneously with molding of the bearing sleeve 8 into a final dimension by a sizing process on a bearing preform obtained by compacting and sintering metal powder), or may be formed by plastic working such as rolling on a bearing preform having a smooth and cylindrical inner peripheral surface in view of satisfactory proccessability of the sintered metal. Further, modes of the radial dynamic pressure generating portions A1, A2 (dynamic pressure generating grooves) are not limited thereto. For example, in any one of or both of the radial dynamic pressure generating portions A1, A2, a plurality of dynamic pressure generating grooves may be arrayed in a spiral pattern in the circumferential direction. Any one of or both of the radial dynamic pressure generating portions A1, A2 may be formed on the outer peripheral surface 2a of the shaft member 2 opposed to the bearing sleeve 8.

The annular member 9 made of metal or a resin and formed into a ring shape is fixed to an upper end portion of an inner peripheral surface 7a1 of the housing 7 by appropriate means such as bonding, press fitting, and press-fit bonding. A radial gap Ga is defined between an inner peripheral surface 9a of the annular member 9 and the outer peripheral surface 2a of the shaft member 2 opposed to the inner peripheral surface 9a. An upper side of the bearing sleeve 8 is open to atmosphere through the radial gap Ga.

Figure 4:
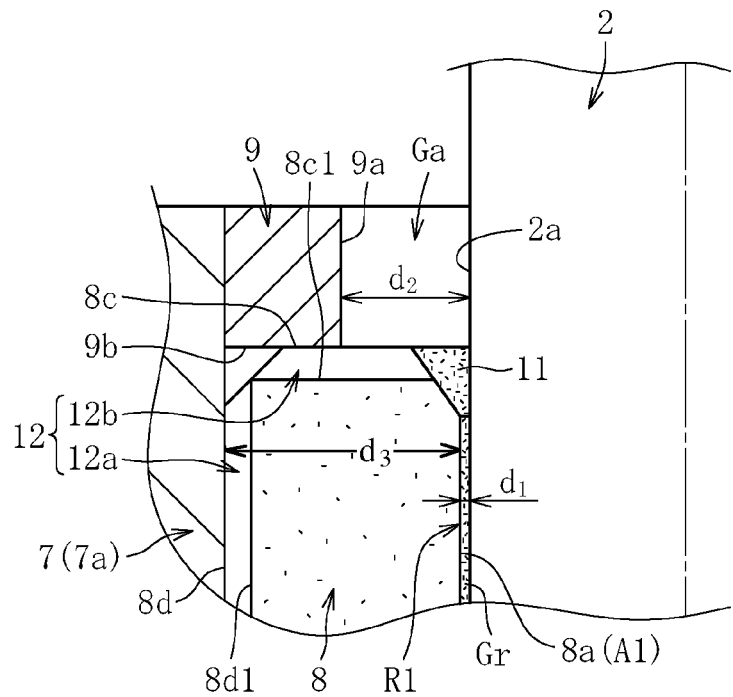
FIG. 4 is an enlarged cross-sectional view illustrating a main part of the fluid dynamic bearing device illustrated in FIG. 2.

As illustrated in FIG. 4 in an enlarged manner, a gap width $d_2$ of the radial gap Ga is set to be larger than a gap width $d_1$ of the radial bearing gap Gr at each of the radial bearing portions R1, R2 (the radial bearing portion R2 is not shown in FIG. 4). Specifically, the inner diameter dimension of the annular member 9 is adjusted so as to satisfy a relationship of $30d_1 \leq d_2$. Note that, the gap width $d_1$ of the radial bearing gap Gr is set depending on required bearing performance, and is often set to about a few micrometers, more specifically, 2 to 10 μm under normal conditions (in FIG. 4, illustration of the gap width $d_1$ of the radial bearing gap Gr is exaggerated). Therefore, for example, in a case where the gap width $d_1$ of the radial bearing gap Gr is set to 10 μm, the gap width $d_2$ of the radial gap Ga is set to 300 μm (0.30 mm) or more.

On the other hand, as described above, the annular member 9 functions as a fixing member for fixing the bearing sleeve 8 to the housing 7. Thus, setting of the gap width $d_2$ of the radial gap Ga to an extremely large size leads to reduction in force for fixing the bearing sleeve 8 to the housing 7. Accordingly, the gap width $d_2$ of the radial gap Ga is set so as to also satisfy a relationship of $d_2 \leq 250 d_1$. Note that, from a different point of view, assuming that $d_3$ represents a radial thickness of the bearing sleeve 8, the gap width $d_2$ of the radial gap Ga is set so as to also satisfy a relationship of $d_2 \leq d_3/2$. For example, in a case of using the bearing sleeve 8 having a radial thickness $d_3$ of 0.8 mm, the gap width $d_2$ of the radial gap Ga is set to 0.4 mm or less.

The fluid dynamic bearing device 1 comprises a communication path 12 for communicating the radial gap Ga and the bottom gap Gb to each other. The communication path 12 comprises a first path 12a formed between the housing 7 and the bearing sleeve 8 so as to have one end that is open to the bottom gap Gb, and a second path 12b formed between the bearing sleeve 8 and the annular member 9 so as to have one end that is open to the radial gap Ga, and another end that is continuous with another end of the first path 12a. In this case, the above-mentioned first path 12a comprises an axial fluid path, which is defined by the inner peripheral surface 7a1 of the housing 7 (cylindrical portion 7a) and one or a plurality of axial grooves 8d1 formed in an outer peripheral surface 8d of the bearing sleeve 8, and a radial fluid path, which is defined by the upper end surface 7c1 of the stepped portion of the housing 7 and one or a plurality of radial grooves 8b1 formed in the lower end surface 8b of the bearing sleeve 8. Further, the above-mentioned second path 12b comprises a radial fluid path defined by a lower end surface 9b of the annular member 9 and one or a plurality of radial grooves 8c1 formed in an upper end surface 8c of the bearing sleeve 8.

Under a state in which the fluid dynamic bearing device 1 having the above-mentioned configuration is arranged in a posture illustrated in FIG. 2, of the interior space of the housing 7, at least the radial bearing gap Gr (radial gap defined between the outer peripheral surface 2a of the shaft member 2 and the inner peripheral surface 8a of the bearing sleeve 8) at each of the radial bearing portions R1, R2, and the bottom gap Gb having the thrust bearing portion T received therein are filled with the lubricating oil 11. In addition, in this embodiment, the radial groove 8b1 formed in the lower end surface 8b of the bearing sleeve 8, an annular space defined by a lower end outer circumferential chamfer of the bearing sleeve 8, and the radial gap (annular space) defined between an upper end inner circumferential chamfer of the bearing sleeve 8 and the outer peripheral surface 2a of the shaft member 2 are also filled with the lubricating oil 11 (see FIG. 2). On the other hand, a part of the communication path 12 is not filled with the lubricating oil 11. Specifically, the axial groove 8d1 (a part of the first path 12a) formed in the outer peripheral surface 8d of the bearing sleeve 8, an annular space defined by an upper end outer circumferential chamfer of the bearing sleeve 8, and the radial groove 8c1 (second path 12b) formed in the upper end surface 8c of the bearing sleeve 8 are not filled with the lubricating oil 11.

With reference to the above description, in the fluid dynamic bearing device 1, an amount (volume) of the lubricating oil 11 filled in the interior space of the housing 7 is smaller than a volume of the interior space of the housing 7. Therefore, in the interior space of the fluid dynamic bearing device 1 (housing 7), there is formed a void section in which the lubricating oil 11 is not filled. In this embodiment, the void section is formed in the part of the communication path 12.

In this case, in consideration of a temperature change and the like during use and transportation of the fluid dynamic bearing device 1, as the lubricating oil 11, ester-based or poly-alpha-olefin-based (PAO-based) lubricating oil is suitably used. In particular, in the fluid dynamic bearing device 1, the gap width $d_2$ of the radial gap Ga formed in the opening portion of the housing 7 is larger than that of the related-art fluid dynamic bearing device (for example, the fluid dynamic bearing device disclosed in Patent Literature 1), and hence the lubricating oil may leak through the radial gap Ga more easily than in the related art. Accordingly, there is suitably used ester-based or PAO-based lubricating oil having kinematic viscosity of 20 to 90 mm²/s at 40° C., and surface tension of 29 to 31 mN/m at 20° C.

The fluid dynamic bearing device 1 having the above-mentioned configuration is assembled in the following procedures.

Figure 5A:
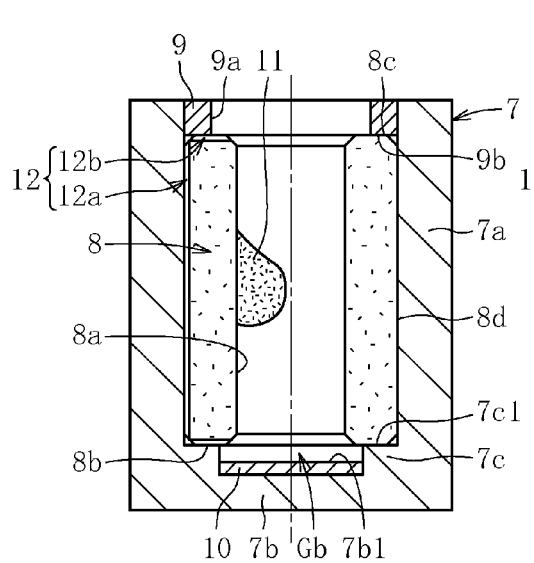
FIG. 5A is a view illustrating an initial stage of a process of assembling the fluid dynamic bearing device illustrated in FIG. 2.
Figure 5B:
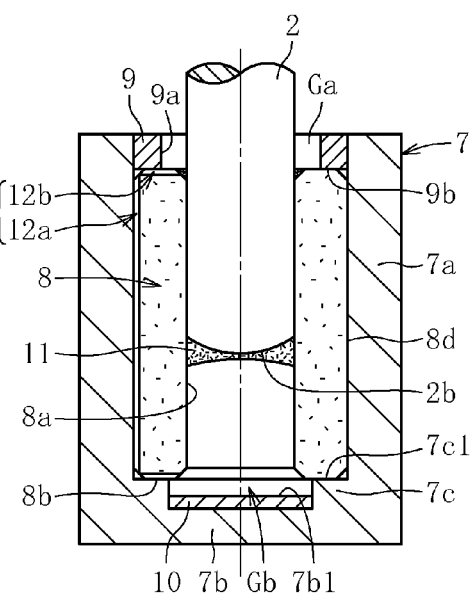
FIG. 5B is a view illustrating an intermediate stage of the process of assembling the fluid dynamic bearing device illustrated in FIG. 2.

First, until the lower end surface 8*b* of the bearing sleeve 8 is brought into abutment on the upper end surface 7*c*1 of the stepped portion 7*c* of the housing 7, the bearing sleeve 8 is lightly press-fitted or loosely fitted to the inner periphery of the housing 7. Next, under a state in which the lower end surface 9*b* of the annular member 9 abuts on the upper end surface 8*c* of the bearing sleeve 8, the annular member 9 is fixed to the upper end portion of the inner peripheral surface 7*a*1 of the housing 7. In this manner, the bearing sleeve 8 is fixed to the inner periphery of the housing 7 so as to be sandwiched from the both axial sides thereof between the annular member 9 and the bottom portion 7*b* (stepped portion 7*c*) of the housing 7. Next, in order to fill respective portions of the interior space of the housing 7 with the lubricating oil 11 under the above-mentioned state, the lubricating oil 11 is filled into the interior space of the housing 7 (for example, the inner periphery of the bearing sleeve 8) (regarding the above description, see FIG. 5A. As illustrated in FIG. 5B, when the shaft member 2 is inserted into the annular member 9 and along the inner periphery of the bearing sleeve 8, the fluid dynamic bearing device 1 illustrated in FIG. 2 is completed.

In the fluid dynamic bearing device 1 having the above-mentioned configuration, when the shaft member 2 is rotated, the radial bearing gaps Gr, Gr are defined between the radial bearing surfaces formed at upper and lower two positions of the inner peripheral surface 8*a* of the bearing sleeve 8, and the outer peripheral surface 2*a* of the shaft member 2 opposed to the radial bearing surfaces. Then, along with rotation of the shaft member 2, pressure of an oil film formed in the both radial bearing gaps Gr, Gr is increased by the dynamic pressure generating action of the radial dynamic pressure generating portions A1, A2, and the radial bearing portions R1, R2 for supporting the shaft member 2 in a non-contact manner in the radial direction are formed at two axial positions. At the same time, the inner bottom surface 7*b*1 of the housing 7 (the upper end surface of the thrust plate 10) forms the thrust bearing portion T for supporting the shaft member 2 in a contact manner in one thrust direction. Note that, as described with reference to FIG. 1, a magnetic force is applied to the shaft member 2 as an external force for forcing the shaft member 2 downward (to the bottom portion 7*b* side of the housing 7). Therefore, the shaft member 2 can be prevented from being excessively floated along with rotation of the shaft member 2, and can be also prevented from being removed from the inner periphery of the bearing sleeve 8 as much as possible.

As described above, in the fluid dynamic bearing device 1 according to the present invention, in a situation where the radial bearing gaps Gr and the bottom gap Gb are filled with the lubricating oil 11 (FIG. 2), the void section is formed in the interior space of the housing 7. This means that an amount of the lubricating oil 11 filled into the interior space is smaller than the volume of the interior space. In the fluid dynamic bearing device 1 according to the present invention, the shaft member 2 is insertable into and removable from the bearing sleeve 8 (and the annular member 9). Accordingly, as described above, only by filling the lubricating oil 11 into the interior space of the housing 7 using an appropriate oil dispenser after the bearing sleeve 8 and the annular member 9 are fixed to the inner periphery of the housing 7 and before the shaft member 2 is inserted along the inner periphery of the bearing sleeve 8, a necessary amount of the lubricating oil 11 can be filled in the interior space of the housing 7. Thus, large-scale device for oil injection and operations to adjust and manage an oil level with high accuracy is not needed, with the result that the fluid dynamic bearing device 1 can be manufactured at low cost.

Figure 7A:
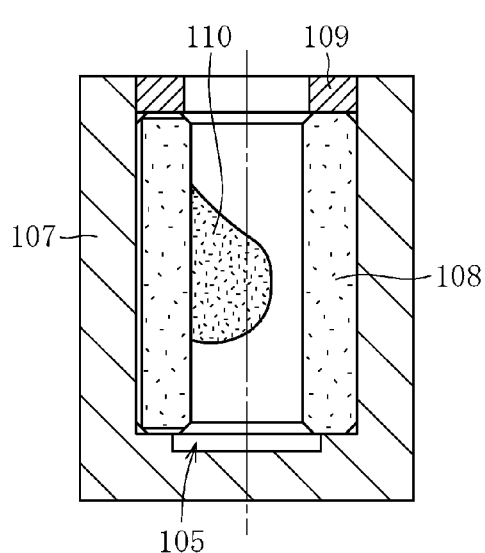
FIG. 7A is a view illustrating an initial stage of a process of assembling a related-art fluid dynamic bearing device.
Figure 7B:
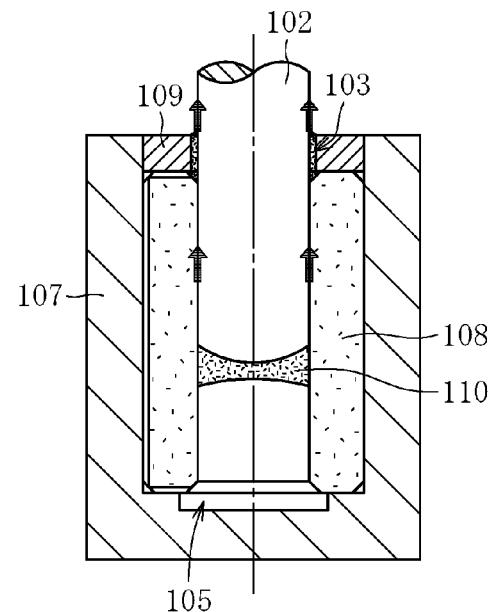
FIG. 7B is a view illustrating an intermediate stage of the process of assembling the related-art fluid dynamic bearing device.

When oil injection into the interior space of the housing 7 is carried out in the above-mentioned procedures, as compared to a case where oil injection into the interior space of the housing 7 is carried out after the shaft member 2 is inserted along the inner periphery of the bearing sleeve 8, oil injecting operations can be carried out more easily and appropriately. However, in a case where no measure is taken, as described with reference to FIGS. 7A and 7B, during insertion of the shaft member 2 along the inner periphery of the bearing sleeve 8, which is carried out after the oil injection, the lubricating oil 11 is liable to leak to an outside of the device through the radial gap Ga defined by the inner peripheral surface 9*a* of the annular member 9.

This problem can be solved by setting the gap width $d_2$ of the radial gap Ga so as to satisfy a relationship of $30d_1 \leq d_2$ when $d_1$ represents the gap width of the radial bearing gap Gr and $d_2$ represents the gap width of the radial gap Ga. That is, in this manner, as illustrated in FIG. 5A, it is possible to effectively prevent the lubricating oil 11 from adhering to the inner peripheral surface 9*a* of the annular member 9 along with insertion of the shaft member 2 along the inner periphery of the bearing sleeve 8, and hence leakage of the lubricating oil to an outside of the housing 7 can be prevented as much as possible. In addition, in this embodiment, the communication path 12 for communicating the radial gap Ga and the bottom gap Gb to each other is formed. Accordingly, even in a case where the shaft member 2 is inserted along the inner periphery of the bearing sleeve 8 after the lubricating oil 11 is injected into the interior space of the housing 7, the air that is pumped into the bottom portion 7*b* side of the housing 7 along with insertion of the shaft member 2 can be discharged to atmosphere through the communication path 12. Therefore, it is possible to more effectively prevent the lubricating oil 11 from leaking to the outside along with insertion of the shaft member 2.

With reference to the above description, assembly of the fluid dynamic bearing device 1, and operations to inject oil into the interior space of the housing 7 can be carried out easily, with the result that the fluid dynamic bearing device 1 can be manufactured at low cost. However, when the gap width $d_2$ of the radial gap Ga is set to an extremely large size, a contact area between the upper end surface 8*c* of the bearing sleeve 8 and the lower end surface 9*b* of the annular member 9 is small, which brings a difficulty in ensuring a necessary force for removing the bearing sleeve 8. Therefore, as described above, an upper limit value of the gap width $d_2$ of the radial gap Ga is set so as to also satisfy a relationship of $d_2 \leq 250 d_1$.

Further, the external force for forcing the shaft member 2 to the bottom portion 7*b* side of the housing 7 (supporting the shaft member 2 in another thrust direction) is applied to the shaft member 2. With this, the shaft member 2 can be supported in both the thrust directions, and hence it is possible to increase support accuracy (rotational accuracy) in the thrust directions. In this embodiment, the external force applied as described above is a magnetic force, and this magnetic force is applied by arranging, with a shift in the axial direction, the stator coils 5 provided to the motor base 6 for holding the housing 7 on its inner periphery, and the rotor magnet 4 provided to the rotor 3. Motors having built therein the fluid dynamic bearing device 1 of this type comprise, as essential components, the rotor magnet 4 and the stator coils 5. Thus, when the above-mentioned configuration is employed, the external force can be inexpensively applied without involving a significant cost increase.

In the configuration of the fluid dynamic bearing device 1 according to the present invention, for example, in a case where the bearing device 1 in the posture illustrated in FIG. 2 is used upside down, the lubricating oil 11 may leak to the outside through the radial gap Ga, which leads to reduction in bearing performance. This problem can be effectively prevented by, for example, (1) forming the radial bearing gap Gr (radial bearing gap Gr at the radial bearing portion R1) having a gap width smaller than the gap width of the radial gap Ga at a position adjacent to the radial gap Ga in the axial direction, (2) forming the radial bearing gaps Gr and the radial dynamic pressure generating portions A1, A2 for generating fluid dynamic pressure in the radial bearing gaps Gr at two axial positions, forming the upper radial dynamic pressure generating portion A1 into such a shape as to pump, into the lower radial bearing gap Gr, the lubricating oil 11 filled in the upper radial bearing gap Gr, and forming the lower radial dynamic pressure generating portion A2 into such a shape as to pump, into the upper radial bearing gap Gr, the lubricating oil 11 filled in the lower radial bearing gap Gr, and (3) selecting and using, as the lubricating oil 11, oil having relatively high viscosity. That is, specifically, with the above-mentioned configuration (1), the lubricating oil 11 is drawn into an interior side of the bearing by a capillary force. With the above-mentioned configuration (2), the lubricating oil 11 filled in the radial bearing gaps Gr (in particular, the upper radial bearing gap Gr) can be prevented as much as possible from flowing toward the radial gap Ga. Therefore, reduction in bearing performance due to leakage of the lubricating oil 11 to the outside can be prevented as much as possible so that desired bearing performance can be maintained stably.

Note that, although not shown, in order to more effectively prevent the leakage of the lubricating oil through the radial gap Ga, an oil repellent film may be formed on the outer peripheral surface 2a of the shaft member 2 or an upper end surface of the annular member 9, which is adjacent to the radial gap Ga and exposed to the atmosphere.

The fluid dynamic bearing device 1 according to the embodiment of the present invention is described above, and various modifications may be made to each part of the fluid dynamic bearing device 1 without departing from the gist of the present invention.

Figure 6:
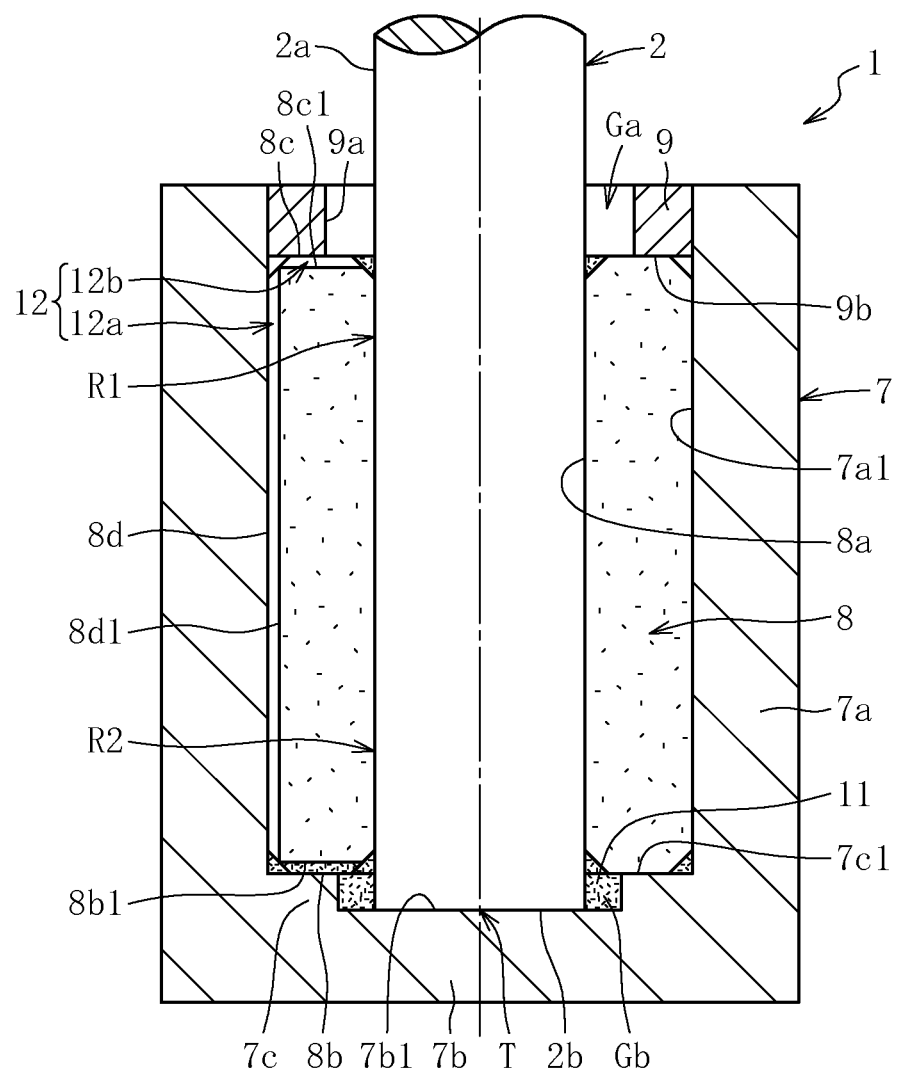
FIG. 6 is a cross-sectional view illustrating a fluid dynamic bearing device according to a second embodiment of the present invention.

For example, the thrust bearing portion T for supporting the shaft member 2 in the thrust direction (one direction) can be formed of a so-called fluid dynamic bearing. FIG. 6 illustrates an example of a case where the thrust bearing portion T is formed of a fluid dynamic bearing. In this case, the lower end surface 2b of the shaft member 2 is formed into a flat surface extending in a direction orthogonal to an axis. Although not shown, the dynamic pressure generating portion (thrust dynamic pressure generating portion) such as dynamic pressure generating grooves is formed on any one of the lower end surface 2b of the shaft member 2 and the inner bottom surface 7b1 of the bottom portion 7b of the housing 7 opposed to the lower end surface 2b.

Further, in the embodiment described above, the housing 7 provided separately from the motor base 6 is fixed to the inner periphery of the motor base 6. However, a part corresponding to the motor base 6 may be formed integrally with the housing 7.

Further, any one of or both of the radial bearing portions R1, R2 may be formed of other publicly known fluid dynamic bearings, such as so-called a multi-lobe bearing, a step bearing, and a wave bearing. Further, in a case where the thrust bearing portion T is formed of a fluid dynamic bearing (FIG. 6), the fluid dynamic bearing may comprise other publicly known fluid dynamic bearings, such as so-called a step bearing and a wave bearing.

Further, in the embodiment described above, the rotor magnet 4 and the stator coils 5 are arranged with a shift in the axial direction so that the external force for forcing the shaft member 2 to the bottom portion 7b side of the housing 7 is applied to the shaft member 2. However, means for applying such an external force to the shaft member 2 is not limited to that in the above description. For example, although not shown, a magnetic member capable of attracting the rotor magnet 4 may be arranged so as to face the rotor magnet 4 in the axial direction so that the magnetic force is applied to the rotor 3. Alternatively, in a case where the thrust force serving as the reactive force for the blowing action is great enough to cause the shaft member 2 to be forced downward due to the thrust force alone, the magnetic force (magnetic attraction force) serving as the external force for forcing the shaft member 2 downward need not be generated.

Further, in the case described above, the present invention is applied to the fluid dynamic bearing device 1 in which the rotor 3 comprising the blades is fixed as a rotary member to the shaft member 2. However, the present invention is suitably applicable also to a fluid dynamic bearing device 1 in which a disk hub having a disk mounting surface or a polygonal mirror is fixed to the shaft member 2 as a rotary member. In other words, the present invention is suitably applicable not only to the fluid dynamic bearing device 1 built in the fan motor as illustrated in FIG. 1 but also to a fluid dynamic bearing device 1 built in other electrical apparatus such as a spindle motor for disk drives and a polygon scanner motor for laser beam printers (LBPs).

EXAMPLE

In order to prove usefulness of the present invention, first, there were prepared a test piece according to Example, which had the configuration of the present invention, and a test piece according to Comparative Example, which did not have the configuration of the present invention. Further, a predetermined amount (3 mg) of lubricating oil was filled into an interior space of each of the test pieces, and then whether or not the lubricating oil leaked to the outside during insertion of the shaft member was confirmed. Details of (A) the test piece according to Example, (B) the test piece according to Comparative Example, and (C) the lubricating oil used in the confirmatory test are as follows.

(A) Test Piece According To Example

The test piece according to Example is an assembly including a bearing sleeve having a size of an inner diameter ϕ of 1.5 mm by an outer diameter ϕ of 3.0 mm, and configured to define, together with the shaft member, a radial bearing gap having a gap width of 5 μm, an annular member configured to define, together with the shaft member, a radial gap (Ga) having a gap width of 0.3 mm, and a housing configured to fix the bearing sleeve and the annular member in the state illustrated in FIG. 2. That is, the test piece according to Example is an assembly including the above-mentioned members, in which the gap width of the radial gap (Ga) is set to sixty times as large as the gap width of the radial bearing gap in view of design.

(B) Test Piece According to Comparative Example

The test piece according to Comparative Example is the same as the test piece according to Example except for employing an annular member configured to define, together with the shaft member, a radial gap (Ga) having a gap width of 0.03 mm. That is, the test piece according to Comparative Example is an assembly including the above-mentioned members, in which the gap width of the radial gap (Ga) is set to six times as large as the gap width of the radial bearing gap in view of design.

(C) Lubricating Oil

Ester-based or PAO-based lubricating oil having kinematic viscosity of 120 mm²/s at 20° C., 45 mm²/s at 40° C., and 8 mm²/s at 100° C. is used.

(D) Remarks

A filling amount of 3 mg of the lubricating oil is an amount capable of almost achieving the state illustrated in FIG. 2 in the respective test pieces, that is, a state in which the radial bearing gap (Gr) and the bottom gap (Gb) are filled with the lubricating oil.

When the shaft member was inserted into the test piece according to Example, the lubricating oil did not adhere to any part of an inner peripheral surface of the annular member from start of insertion until finish of insertion. Therefore, even at a point in time when insertion of the shaft member was completed, the lubricating oil did not leak through the radial gap (Ga). On the other hand, when the shaft member was inserted into the test piece according to Comparative Example, at a point in time when the shaft member was inserted by a predetermined amount, the lubricating oil adhered to the inner peripheral surface of the annular member. Then, when the shaft member was further inserted, the lubricating oil leaked to an outside of the test piece through the radial gap (Ga). Accordingly, with the configuration according to the present invention, it is possible to effectively prevent leakage of the lubricating oil to the outside at the time of insertion of the shaft member.

Further, in addition to conducting the above-mentioned confirmatory test, whether or not the lubricating oil leaks to the outside was confirmed when the fluid dynamic bearing device was formed by inserting the shaft member into the test piece according to Example, and then the bearing device was operated in an inverted posture (posture illustrated in FIG. 2) continuously for one hour. As a consequence, even at the time of the continuous operation, in the fluid dynamic bearing device obtained by inserting the shaft member into the test piece according to Example, the lubricating oil did not leak to the outside. Accordingly, with the configuration according to the present invention, it is possible to effectively prevent even reduction in bearing performance due to leakage of the lubricating oil to the outside during the operation.

REFERENCE SIGNS LIST 1 fluid dynamic bearing device
2 shaft member
3 rotor (rotary member)
4 rotor magnet
5 stator coil
6 motor base
7 housing
7a cylindrical portion
7b bottom portion
7c stepped portion
8 bearing sleeve
9 annular member
10 thrust plate
11 lubricating oil
12 communication path
12a first path
12b second path
A1, A2 radial dynamic pressure generating portion
Ga radial gap
Gb bottom gap
Gr radial bearing gap
R1, R2 radial bearing portion
T thrust bearing portion
$d_1$ gap width of radial bearing gap
$d_2$ gap width of radial gap

The invention claimed is:

1. A fluid dynamic bearing device, comprising:
a housing formed into a bottomed cylindrical shape so as to have one open axial end and another closed axial end;
a bearing sleeve fixed to an inner periphery of the housing;
a shaft member removably inserted along an inner periphery of the bearing sleeve;
an annular member having an inner peripheral surface for defining a radial gap together with an outer peripheral surface of the shaft member, the annular member being fixed to an inner periphery of the one open axial end of the housing in a state of engaging with the bearing sleeve in an axial direction;
a radial bearing portion for supporting the shaft member in a radial direction by an oil film of lubricating oil, which is formed in a radial bearing gap defined between an inner peripheral surface of the bearing sleeve and the outer peripheral surface of the shaft member;
a thrust bearing portion for supporting the shaft member in a thrust direction; and
a bottom gap having the thrust bearing portion received therein, and being filled with the lubricating oil,
wherein the housing has a void section formed in an interior space thereof, the void section not being filled with the lubricating oil,
wherein assuming that $d_1$ represents a gap width of the radial bearing gap and $d_2$ represents a gap width of the radial gap, a relationship of $30d_1 \le d_2 \le 250d_1$ is satisfied, and
wherein, in a standing position state where the one open axial end of the housing is arranged at an upper side in a vertical direction and the another closed axial end of the housing is arranged at a lower side in the vertical direction, an oil level of the lubricating oil is maintained in an annular space that is defined between an inner circumferential chamfer which arranged at one axial end of the bearing sleeve and the outer peripheral surface of the shaft member.

2. The fluid dynamic bearing device according to claim 1, further comprising a communication path for communicating the radial gap and the bottom gap to each other,
wherein the void section is formed in at least a part of the communication path.

3. The fluid dynamic bearing device according to claim 2, wherein the communication path comprises:
a first path formed between the housing and the bearing sleeve so as to have one end that is open to the bottom gap; and
a second path formed between the bearing sleeve and the annular member so as to have one end that is open to the radial gap, and another end that is continuous with another end of the first path.

4. The fluid dynamic bearing device according to claim 1, wherein the bearing sleeve is fixed to the inner periphery of the housing while being sandwiched from both axial sides thereof between the annular member and a bottom portion of the housing.

5. The fluid dynamic bearing device according to claim 1, wherein the radial bearing gap comprises radial bearing gaps formed at two axial positions,
wherein the fluid dynamic bearing device further comprises radial dynamic pressure generating portions formed at two axial positions, for causing dynamic pressure generating action in the lubricating oil in the radial bearing gaps,
wherein one of the radial dynamic pressure generating portions is formed into such a shape as to pump the lubricating oil, which is filled in one of the radial bearing gaps, into another one of the radial bearing gaps, and
wherein another one of the radial dynamic pressure generating portions is formed into such a shape as to pump the lubricating oil, which is filled in the another one of the radial bearing gaps, into the one of the radial bearing gaps.

6. The fluid dynamic bearing device according to claim 1, wherein the shaft member is subjected to an external force for forcing the shaft member to an inner bottom surface of the housing.

7. The fluid dynamic bearing device according to claim 1, wherein the bearing sleeve comprises a porous body having internal pores impregnated with the lubricating oil.

8. The fluid dynamic bearing device according to claim 1, wherein the lubricating oil comprises ester-based or PAO-based lubricating oil having kinematic viscosity of 20 to 90 mm$^2$/s at 40° C., and surface tension of 29 to 31 mN/m at 20°C.

9. A motor, comprising the fluid dynamic bearing device of claim 1.

* * * * *